United States Patent [19]
Hill et al.

[11] Patent Number: 5,494,544
[45] Date of Patent: Feb. 27, 1996

[54] AUTOMATIC VERIFIED EMBOSSED CARD PACKAGE PRODUCTION METHODS

[75] Inventors: Jeffery L. Hill, Mundelein; Gregory S. Hill, Lake Zurich, both of Ill.; Robert J. Bretl, Menominee, Mich.; Gary Zuck, Prospect Heights, Ill.; Fred J. Kassabian, Arlington Heights, Ill.; Bryant J. Jordan, Mt. Prospect, Ill.

[73] Assignee: Dynetics Engineering Coporation, Lincolnshire, Ill.

[21] Appl. No.: 36,657

[22] Filed: Mar. 24, 1993

Related U.S. Application Data

[63] Continuation-in-part of Ser. No. 19,865, Feb. 19, 1993, abandoned.

[51] Int. Cl.⁶ .................................................. B32B 31/00
[52] U.S. Cl. .................. 156/64; 156/219; 156/277; 156/299; 156/378; 156/387; 235/380; 235/437; 235/488
[58] Field of Search .............................. 156/64, 219, 220, 156/277, 299, 378, 387, 541, 289; 235/375, 380, 437, 488, 489

[56] References Cited

U.S. PATENT DOCUMENTS

| | | | |
|---|---|---|---|
| 3,743,817 | 7/1973 | Kuehnle | 235/61.11 J |
| 3,861,299 | 1/1975 | Drillick . | |
| 3,954,542 | 5/1976 | Solomon | 156/64 |
| 3,964,947 | 6/1976 | Mort, Jr. et al. | 156/64 |
| 4,034,210 | 7/1977 | Hill et al. . | |
| 4,088,216 | 5/1978 | La Manna et al. . | |
| 4,180,338 | 12/1979 | La Manna et al. . | |
| 4,271,012 | 6/1981 | La Manna et al. . | |
| 4,384,196 | 5/1983 | McCumber et al. . | |
| 4,384,711 | 5/1983 | Gabel et al. . | |
| 4,420,819 | 12/1983 | Price et al. . | |
| 4,429,217 | 1/1984 | Hill et al. . | |
| 4,686,898 | 8/1987 | La Manna et al. . | |
| 4,688,785 | 8/1987 | Nubson et al. . | |
| 4,755,069 | 7/1988 | La Manna et al. . | |
| 4,784,059 | 11/1988 | La Manna et al. . | |
| 4,789,420 | 12/1988 | La Manna et al. . | |
| 4,855,578 | 8/1989 | Hirokawa et al. | 235/380 |
| 4,866,545 | 9/1989 | La Manna et al. . | |
| 4,900,168 | 2/1990 | La Manna et al. . | |
| 5,058,873 | 10/1991 | Hewitt | 270/52 |
| 5,151,582 | 9/1992 | Fujioka | 235/469 |
| 5,370,763 | 12/1994 | Curiel | 156/289 |
| B14,194,685 | 2/1985 | Hill et al. . | |

*Primary Examiner*—Chester T. Barry
*Attorney, Agent, or Firm*—Potthast & Ring

[57] ABSTRACT

Methods of operating embossed card package production system (10) by verifying by reading and comparing information obtained by reading embossed (32) and magnetically encoded information (35) and coded information (27) on a carrier (26A, 26B) stored card and carrier information in a forms data memory (44) and a card data memory (40) to make new cards appropriately prepared and are correctly matched to the carriers (26A, 26B). Incorrect cards (30) are sent to a reject location (90) to prevent formation of incorrect packages. Only cards (30) which are determined to be correctly prepared have activation labels 21 applied which also serve to distinguish them from incorrectly prepared cards (30) and inventory reports are automatically kept of rejected carriers, rejected cards and the number of labels as well as the number of correct carriers produced which are printed on the very type of carrier to which the accounting information relates with a carrier printer (48). Multiple types of bar codes (22) are identified and decoded automatically.

33 Claims, 9 Drawing Sheets

AUTOMATIC VERIFIED EMBOSSED CARD PACKAGE PRODUCTION METHODS

CROSS-REFERENCES TO RELATED APPLICATION

This application is a continuation-in-part of U.S. patent application Ser. No. 08/019,865 entitled "Automatic Embossed Card Package Production Apparatus and Methods" of Hill et al. filed Feb. 19, 1993, now abandoned, Appendix A of which is incorporated by reference.

BACKGROUND OF THE INVENTION

Field of the Invention

This invention relates to methods for automatically producing embossed card packages composed of embossed cards mounted to matching carrier mailing forms which, in turn, are stuffed into window envelopes for mailing.

Description of the related art including information disclosed under 37 CFR 1.197–1.99

Credit card embossers of the type which create embossed, or raised, characters on plastic or metal cards, such as credit cards, debit cards, charge cards, library cards, identification cards, access cards, and the like are well known. Examples of such apparatus are show in U.S. Pat. No. 3,861,299 of Drillick entitled "High Speed Automatic Card Embosser" issued Jan. 21, 1975; U.S. Pat. No. 4,088,216 of LaManna et al. entitled "Automatic Embossing System" issued May 9, 1978; U.S. Pat. No. 4,180,338 of LaManna et al. entitled "Automatic Embossing System With Document Transfer" issued Dec. 25, 1979; U.S. Pat. No. 4,271,012 of LaManna et al. entitled "Automatic Embossing System" issued Jun. 2, 1981; U.S. Pat. No. 4,384,711 of Gabel et al. entitled "Card Feeding Apparatus For an Automatic Embossing System" issued May 24, 1983; U.S. Pat. No. 4,420,819 of Price et al. entitled "System For Processing and Storing Transaction Data and For Transmitting the Transaction Data to a Remote Host Computer" issued Dec. 13, 1983; U.S. Pat. No. 4,686,898 of LaManna et al. entitled "Credit Card Embossing System" issued Aug. 18, 1987; U.S. Pat. No. 4,688,785 of Nubson et al. entitled "Embossing Assembly For Automatic Embossing System" issued Aug. 25, 1987; U.S. Pat. No. 4,755,069 of LaManna et al. entitled "Credit Card Embossing and Recording System" issued Jul. 5, 1988; U.S. Pat. No. 4,784,059 of LaManna et al. entitled "Credit Card Embossing System" issued Nov. 15, 1988; U.S. Pat. No. 4,789,420 of LaManna et al. entitled "Credit Card Embossing System" issued Dec. 6, 1988; U.S. Pat. No. 4,866,545 of LaManna et al. entitled "Credit Card Embossing and Recording System" issued Sep. 12, 1989 and U.S. Pat. No. 4,900,168 of LaManna et al. entitled "Credit Card Transporting Embossing and Recording System" issued Feb. 13, 1990.

Likewise, it is known to automatically mount preembossed cards to carrier mailing forms, or carriers, by the inserters shown in U.S. Pat. No. 4,034,210 of Hill et al. entitled "Credit Card Carriers and Methods of Manufacture" issued Jul. 5, 1977; U.S. Pat. No. B1 4,194,685 of Hill et al. entitled "Verifying Insertion System Apparatus and Method of Operation" issued Feb. 19, 1985 and U.S. Pat. No. 4,429,217 entitled "Verifying Insertion System and Apparatus" issued Jan. 31, 1984.

Apparatus for automatically "stuffing" such carrier mailing forms into window envelopes and automatically applying postage are also known.

An attempt has been made to combine the functions of embossing and inserting cards into a single card package production apparatus which is illustrated in U.S. Pat. No. 4,384,196 issued May 17, 1983 to McCumber et al. While this combination embosser/inserter unit has been used successfully, it is known to suffer from certain disadvantages. Most importantly, it lacks full verification to make sure the card has been correctly embossed and that the carrier into which it is inserted is the mailing form with the correct name and address of the party to whom the inserted cards are issued. Instead, the McCumber et al. unit relies upon rigid synchronization in the production of embossed cards and matching carriers to achieve their coming together in matching relationship. Consequently, even when an erroneous card is known to have been produced, it must still be inserted into a carrier so as not to disrupt the rigid synchronization upon which successful operation of the McCumber et al unit depends. Otherwise, it is presumed that the carrier has been correctly printed; it is assumed that if the card has been embossed, it has been embossed correctly. It is assumed that the cards and carriers have been correctly prepared and at the right time so that only correctly prepared cards are mounted to corresponding prepared carriers. Neither the carriers nor the embossments on the cards are checked for accuracy. Because the rejected cards are allowed to be inserted into carriers before rejection, incorrect, rejected card packages that confusingly look like correct ones are disadvantageously produced.

In order to reduce fraudulent use of cards by unauthorized persons who intercept a card package or steal or otherwise obtain a new card, it has recently been a practice in the card issuing industry to not "activate" a card, i.e. not place it on a list of cards approved for use, until receipt by the proper party is confirmed. Notification of this fact, as well as procedures to activate the card have been printed on stick-on activation labels which are adhered to the cards. The known systems have no provision for producing card packages with such activation labels, and it is only known to apply activation labels manually. Such manual application of activation labels is disadvantageously slow, labor intensive and is prone to human error as well as difficulties in maintaining control. While equipment for automatically labeling envelopes are commercially available but they are not adapted for applying labels to embossed cards.

Since carriers in the known McCumber et al. system were mounted to carriers even if it was known that the cards had been incorrectly prepared, there was no means for keeping separate track of the number of carriers and the number of cards rejected and produced.

SUMMARY OF THE INVENTION

It is therefore the principal object of the present invention to provide methods for producing embossed card packages which are verified correct and which have features overcoming the disadvantages in known card production systems noted above.

This object of the invention is achieved in part by providing in an embossed card package production system having means for accessing stored embossed card information and means for embossing a card with the stored embossed card information, a method of producing an embossed card package with verified embossed cards, comprising the steps of (a) reading the embossed information on the cards with an embossed character reader, (b) comparing the embossed information read from the cards with the stored embossed information for the card to determine if there is a mismatch and (c) automatically identifying as incorrect each card for which it is determined during the step of comparing that there is a mismatch.

Preferably, the incorrect cards are rejected to prevent mounting to a carrier form and a new card is produced while the corresponding carrier is held in a position for mounting the new correct card while it is being prepared. Thus, only cards verified to have been correctly prepared are mounted to carriers to avoid any possible confusion.

Also, the object of the invention is partially obtained by providing a card package production system having means for accessing stored carrier information and means to print the stored carrier information onto the carrier with a method of producing an embossed card package with a verified carrier, comprising the steps of (a) reading from each carrier information printed on the carrier, (b) comparing the carrier information read from said carrier with the stored carrier information to determine if there is a mismatch and (c) automatically identifying each carrier as an incorrect carrier in response to the comparing means determining there is a mismatch.

Preferably, each carried identified as incorrect is rejected to prevent mounting of a card to an incorrect carrier and a new correct carrier is produced while the corresponding cards to be mounted to the new correct carrier is held in production. Thus, again the cards are mounted only to carriers verified to have been correctly produced.

Obtainment of the object is also achieved in part by provision of a method of automatically producing verified embossed card packages, comprising the steps of (a) automatically embossing the cards with selected card information, (b) automatically checking cards for correctness, (c) automatically rejecting incorrect cards, (d) passing correct cards to a labeler and (e) automatically applying removable informational labels to the correct cards passed to the labeler.

Preferably, label inventory information is accumulated and printed on the one of the carriers, and the step of passing is also performed automatically by a card transport mechanism.

Moreover, the object of the present invention is additionally achieved by providing a method of automatically producing verified embossed card packages, comprising the steps of (a) preparing cards with machine readable indicia, (b) automatically applying labels with information relating to card activation to the cards at a location spaced from the machine readable indicia, (c) mounting the cards with applied labels to matching carriers with information that matches the machine readable indicia and (d) mailing the matching carrier with matched mounted cards with applied labels to a card user.

The object of the invention is also obtained in part by providing a method of automatically producing verified embossed card packages with cards mounted to mailing forms, comprising the steps of (a) obtaining card information for each of the cards, (b) sensing a code printed on the carrier, (c) automatically determining which of a plurality of different possible types of codes on the carriers is the code sensed from each carrier, (d) decoding from each carrier the code in accordance with the type of code determined for each carrier to obtain carrier information, (e) comparing the card information for each card with the obtained carrier information to determine if there is a match, (f) rejecting cards which do not match the carrier information decoded from the carrier and (g) mounting cards to carriers which have carrier information decoded from said plurality of codes that matches the card information for each of the cards to be mounted to the carrier.

The object of the invention is also achieved in part by provision of a method of producing verified credit card packages, each having at least one card with card information mounted to a mailing form with carrier information corresponding to the card information of the mounted card, comprising the steps of (a) rejecting cards which have incorrect card information, (b) rejecting carriers which have incorrect carrier information printed thereon and (c) accumulating card package production information including the number of cards rejected and the number of carriers rejected.

Preferably, the card package production information is accumulated and printed by a carrier printer used to produce the carriers. When the card package production information is accumulated with respect to cards mounted to different kinds of carriers, the accumulated card package information is printed on the same kind of carrier with respect to which the information is accumulated so a record of not only the inventory number is stored but also a sample of the kind of form which is used.

BRIEF DESCRIPTIONS OF THE DRAWINGS

The foregoing objects and advantageous features of the invention will be explained in greater detail and others will be made apparent from the detailed description of the preferred embodiment of the present invention which is given with reference to the several figures of the drawing, in which.

DESCRIPTION OF THE PREFERRED EMBODIMENT

Figure 1:
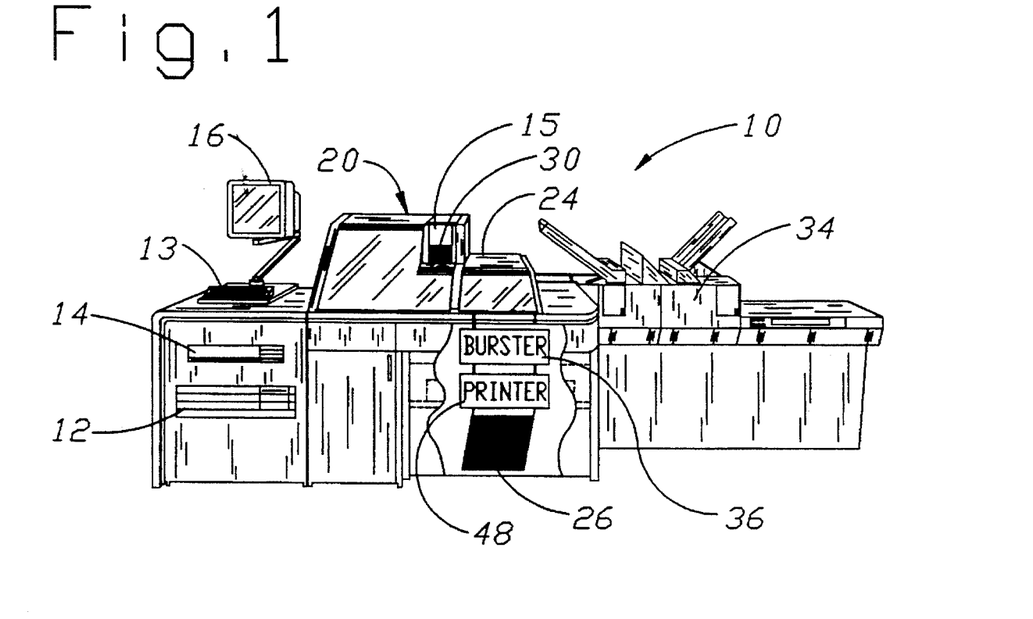
FIG. 1 is a frontal perspective view of the preferred embodiment of the embossed card package production system with portions broken away to schematically illustrate the carrier, carrier printer and carrier burster.

Referring to FIG. 1, the preferred embodiment of the embossed card package production system 10 functions to produce fully verified, embossed and encoded credit cards mounted to verifiably matched carrier forms, or carriers, with the account owner's name and mailing address printed thereon and inserted into window envelopes that are metered with appropriate postage and are ready for mailing.

Figure 2:
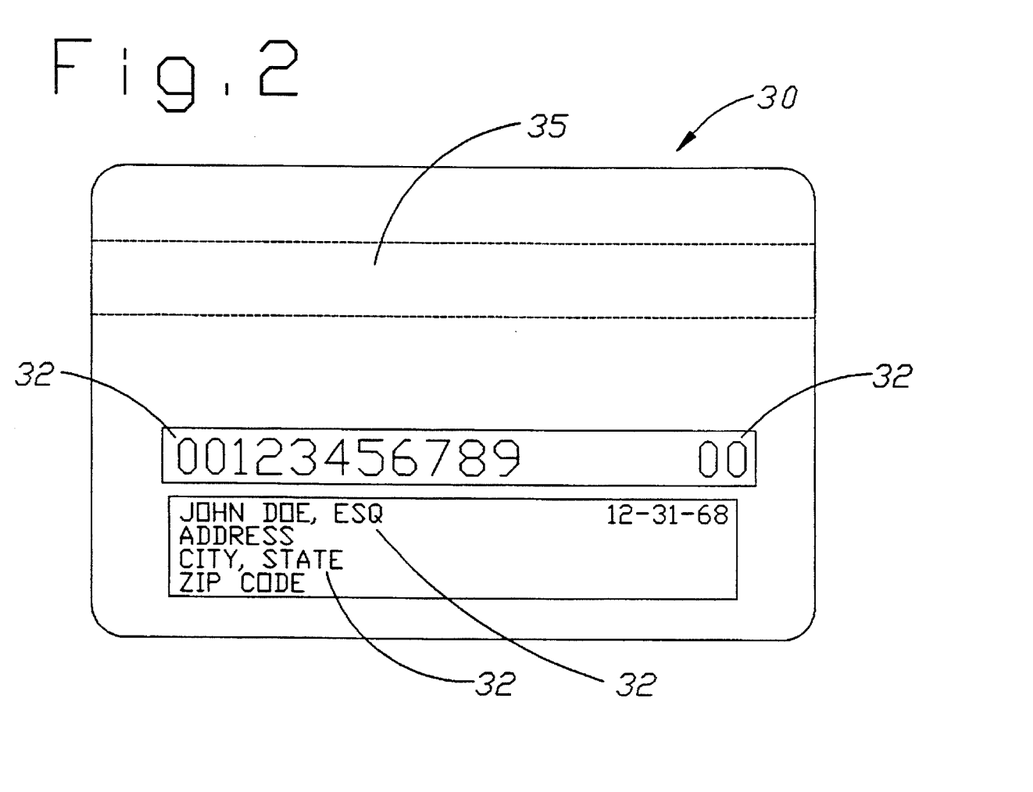
FIG. 2 is an illustration of a representative embossed card having a magnetic stripe and embossed characters.

The system 10 preferably includes a 486 DX computer 12 and an open reel tape drive 14 for controlling the operation of the system. A keyboard 13 is used for manual input of account data and control information into the computer 12. Information inserted into the computer 12 memory is shown at a display screen 16 of the system 10. An embosser section 20 embosses various alphanumeric characters 32 on the face of the card 30, generally the account number and name of the account owner associated with the card, and magnetically encodes like information on a magnetic stripe 35 on the back of the card 30. The embossed and encoded cards 30, FIG. 2, are carried from the embosser section 20 to a card inserter section 24. The inserter section 24 inserts correctly embossed and encoded cards 30 into verifiably matched and correctly printed carrier forms 26. The carrier forms 26 hold one or more embossed cards 30, FIG. 2, which are folded and stuffed into suitable window envelopes (not shown) at an envelope stuffer 34. The stuffed envelopes containing the carrier forms 26 with matching cards 30 are transported to a postage metering machine 18, FIG. 4 (not shown in FIG. 1), to print the appropriate mailing postage on the stuffed envelopes. The materials from which these embossed card packages are produced include blank carrier forms, or carriers, 26 and blank credit cards or like, such as shown in the U.S. patents noted above.

Figure 3A:
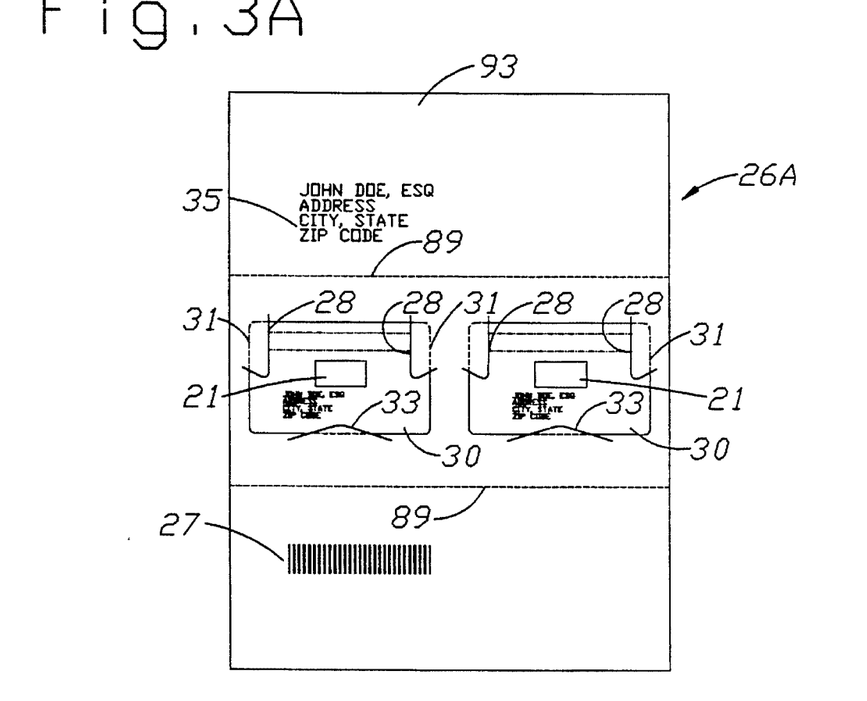
FIGS. 3A and 3B are front views of preferred embodiments of two different types of card carrier forms designed for use with the preferred embodiment of the card package production system of FIG. 1.
Figure 3B:
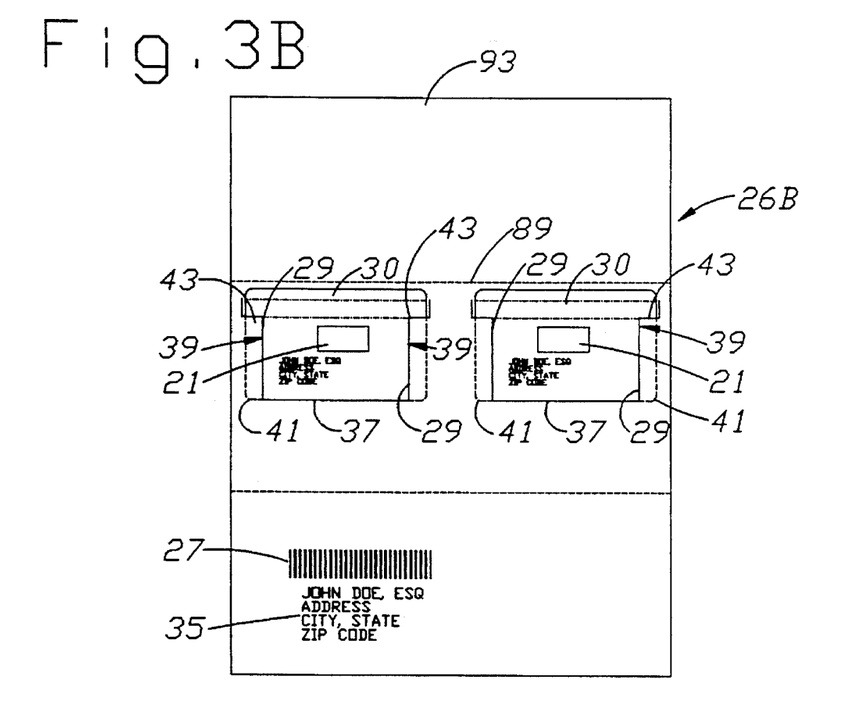

The carrier forms 26 are preferably one of those shown in FIGS. 3A and 3B and a plurality of these interconnected carrier forms 26 are fanfolded like those shown in U.S. Pat. No. 4,034,210 issued Jul. 5, 1977 to Hill et al., and as shown in FIG. 1, but are without marginal pin holes for pin drive feed mechanisms which are not employed in the ECPAP system 10. The printer 48 prints on both types of carrier forms the name and address 35 and bar code 27. The cards 30 with activation labels are mounted to the carrier by means of pockets cut into the plane paper holes 93. For further detailed information about the carrier of FIGS. 3A and 3B, reference should be made to U.S. patent application Ser. No. 08/036,436 of Hill et al. entitled "Card Carrier Forms For Automated Embossed Card Package Production System" filed Mar. 24, 1993, contemporaneously herewith. After having carrier information printed on the end one of a plurality of interconnected, fan folded carriers 26, a burster separates the end one from the others before cards 30 are inserted.

Referring to FIG. 2, the cards 30 have a field for receipt of embossed characters 32 and a magnetic stripe 35 for receipt of magnetically encoded magnetic stripe data relating to the account associated with the card. Common window envelopes which have transparent sections to enable viewing of the name and mailing address printed on the contents of the carrier mailing form are, of course, also provided as well as a full charge, or load, to the postage metering machine.

The system 10 housing contains a slide out drawer for holding the tape driver 14. The blank cards 30 are stacked in a hopper, or chute, 15 and are transported to the card embosser encoder section 20. The cards 30 are embossed with the stored card account information such as the account owner's name, address, card number and expiration date as seen in FIG. 2. The embosser section 20, FIG. 1, also magnetically encodes each card with information identifying the embossed card 30 on the magnetic stripe 35, FIG. 2, of the card. The embossed and encoded cards 30 which are correctly prepared are transported to a card labeler 60, FIG. 4, for automatic placement of removable stick-on activation labels 21 on the card 30. The adhered activation labels preferably are preprinted with a telephone number of the card issuer which the card owner calls upon receipt of the card pack through the mail to request activation of the card for use. The correctly prepared embossed cards 30 with the affixed activation labels are then passed to the card inserter 24 for placement in printed card carrier forms 26. In keeping with one aspect of the invention, labels are only applied to cards determined to be correctly prepared to avoid confusion between correctly and incorrectly prepared cards.

A fan folded stack of blank carrier forms 26 are carried through a forms printer 48 by a forms feeder in the card insertion module 24. The printer 48 prints account information such as the card account owner's name, number and address at a name and address field 35 on the blank carrier forms 26A and 26B. Additionally, one of a plurality of different bar codes 27, such as interleaved two of five code, interleaved three of nine code, Codabar UPC-A&E code, EAN-8 code and EAN-13 code are used to encode the card account information printed on the form 26 such as the account number and name.

The plurality of fan folded carrier forms 26, once printed, are sent to a form burster 36. As noted, the form burster 36 separates the end printed carrier forms 26 from the fan folded plurality of carrier forms 26 to produce individual carrier forms. In addition, in the preferred embodiment, the form burster 36 carries a sensor for reading the code 27 from each carrier form 26 as it is separated from the fan carrier forms 26. For further information relating to the burster, reference should be made to U.S. patent application Ser. No. 08/036,159 of Hill et al. entitled "Card Package Production System With Burster and Carrier Verification Apparatus" filed Mar. 24, 1993, contemporaneously herewith. The separated carrier forms 26 are transported to the card inserter section 24 for receipt of the embossed cards 30. As many as four embossed cards are insertable into a single carrier form 26.

Figure 4:
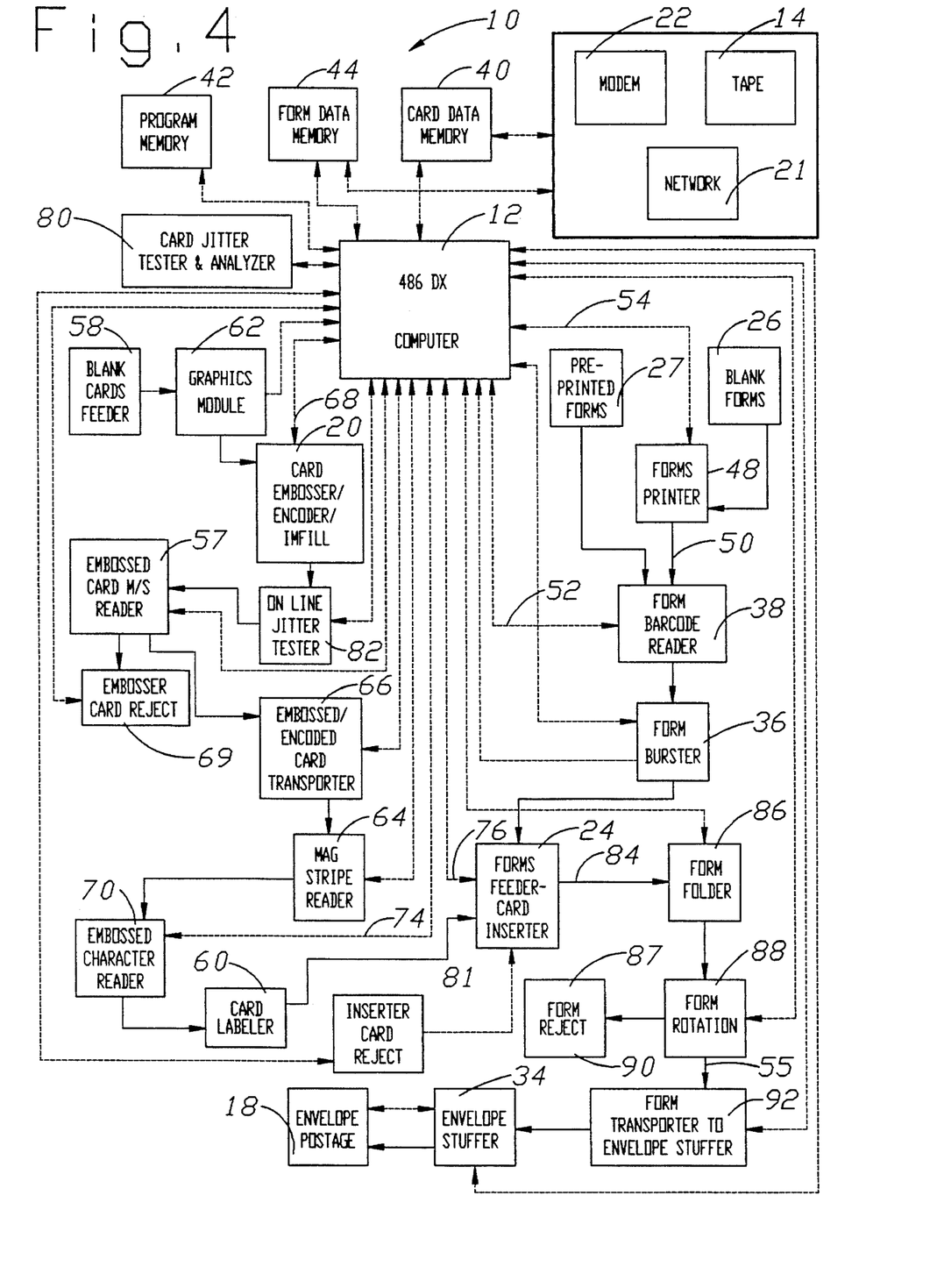
FIG. 4 is a functional block diagram of the preferred embodiment of the embossed card pack production system of FIG. 1 and further illustrating the preferred steps for producing an embossed card package.

If the information embossed or encoded on the embossed card 30 is not correctly prepared or does not match the associated carrier form 26, the card 30 is sent to one of two reject locations 69 and 81, FIG. 4, without being mounted to a carrier 26 to avoid confusion. Likewise, carrier forms 26 which are not correctly prepared or do not match are rejected and sent to a rejected form location 90, FIG. 4, without having cards mounted to them to avoid confusion. Only correctly prepared carrier forms 26 containing correctly prepared and matching embossed cards 30 are folded and transported to the envelope stuffer 34. Only the envelopes with fully verified carriers are stuffed with the filled card carriers 26 and are transferred to a postage metering machine 18, FIG. 4, to place the appropriate postage on the envelope.

Referring now particularly to FIG. 4, card account data information is stored in a card account data memory 40, preferably a 330 Mbyte, 33 Mhz memory type for the 486 DX computer 12 made by Everex. The card account data for as many as 400,000 accounts are stored in the memory 40 with 870 bytes per account.

The account information preferably includes the name of the account, or owner of the account, the account number, the date of issuance, the date of expiration, the number of cards per account, the credit limit as well as other account information. The card account information stored in the card data memory 40 and the carrier form data stored in the form data memory 44 are selectively obtainable insertable from a number of different data input sources. A modem 22 inputs form and card data information over a telephone line from a remote computer (not shown) to the form data memory 44 and card data memory 40. Alternatively, a hardwire network 21 is used to transfer information from a plurality of computers for receipt at the system 10. Alternatively, a tape reel 14 or the like is employed for inputting card and carrier form data at the hard drive of the ECPAP system 10. This account information is organized in blocks relating to embossments, magnetic stripe encoding and carrier printing. At least some of the information of each block, such as the account number, must correspond or match some of the information of the other blocks.

Based on this account data and control information from manual inputs on the keyboard 13, FIG. 1, the system 10 produces the fully verified embossed card package comprising verified correct credit cards attached to verified correct carrier forms verified to match the attached cards within envelopes bearing postage and ready for mailing to the account owner at the name and address printed on the carrier. As noted, the verification is of the utmost importance to insure that only correctly embossed and correctly encoded cards are attached to matching carrier forms which bear the correct name and address of the account owner of the attached cards. Accordingly, one separate data verification is performed on the forms 26 while three separate data verifications are performed on the cards in addition to matching verification between the carriers and matching cards.

Referring still to FIG. 4, the operation of the 10 is under control of a microprocessor based computer 12 which communicates with the various other functional blocks as indicated by broken line connections therebetween. Card flow between the functional blocks is indicated with solid line connection while carrier flow is indicated by solid bold line connections. The microprocessor 12 is preferably a model A80486DX-3301 or equivalent microprocessor made by Intel Corporation operating at thirty-three MHz, while the program memory 42 and thus data memory is contained in a single or multiple sectored hard drive having a storage capacity of 330 MBytes and preferably comprises a model LXT340A made by Maxtor Corp. An algorithm of the program stored in the program memory 42 pursuant to which the microprocessor 12 operates to control the remaining electromechanical elements of the system 10 is illustrated in FIGS. 5A, 5B, 5C, 6 and 7 and by the listing of the preferred program for implementing the algorithm of FIG. 5A, 5B and 5C, attached hereto as Exhibit A.

Beginning with the flow of carriers 26, under control of the microprocessor 12, blank carrier forms 26 from a supply of fan folded forms 26 are then passed one at a time through a forms printer 48. A carrier form data memory 44 associated with the microprocessor 12 stores information for printing on the blank carrier forms 26. The forms printer 48 then prints on each form stored carrier form information taken from the form carrier data memory 44. This information is selected by the microprocessor 12 from the form carrier data memory 44 and relates to an associated account from the card data memory 40 including the name and mailing address of the account holder and also including other information such as the number of cards to be attached to the carrier form, the dates of issuance and expiration and the credit limit. In addition to the carrier data, the forms printer 48 under control of the microprocessor 12 also prints the bar code 27 and preselected graphics in color, if desired, and other written information, such as the terms of the agreement, which have been preselected for all or a batch of carriers stored in carrier graphics and carrier printing sections of the carrier form data memory 44. Alternatively, preprinted carrier forms 27 with the preprinted carrier account data on the forms are send directly to the form bar code reader 38 and are used for receipt of embossed cards 30 in the system 10.

Figure 7:
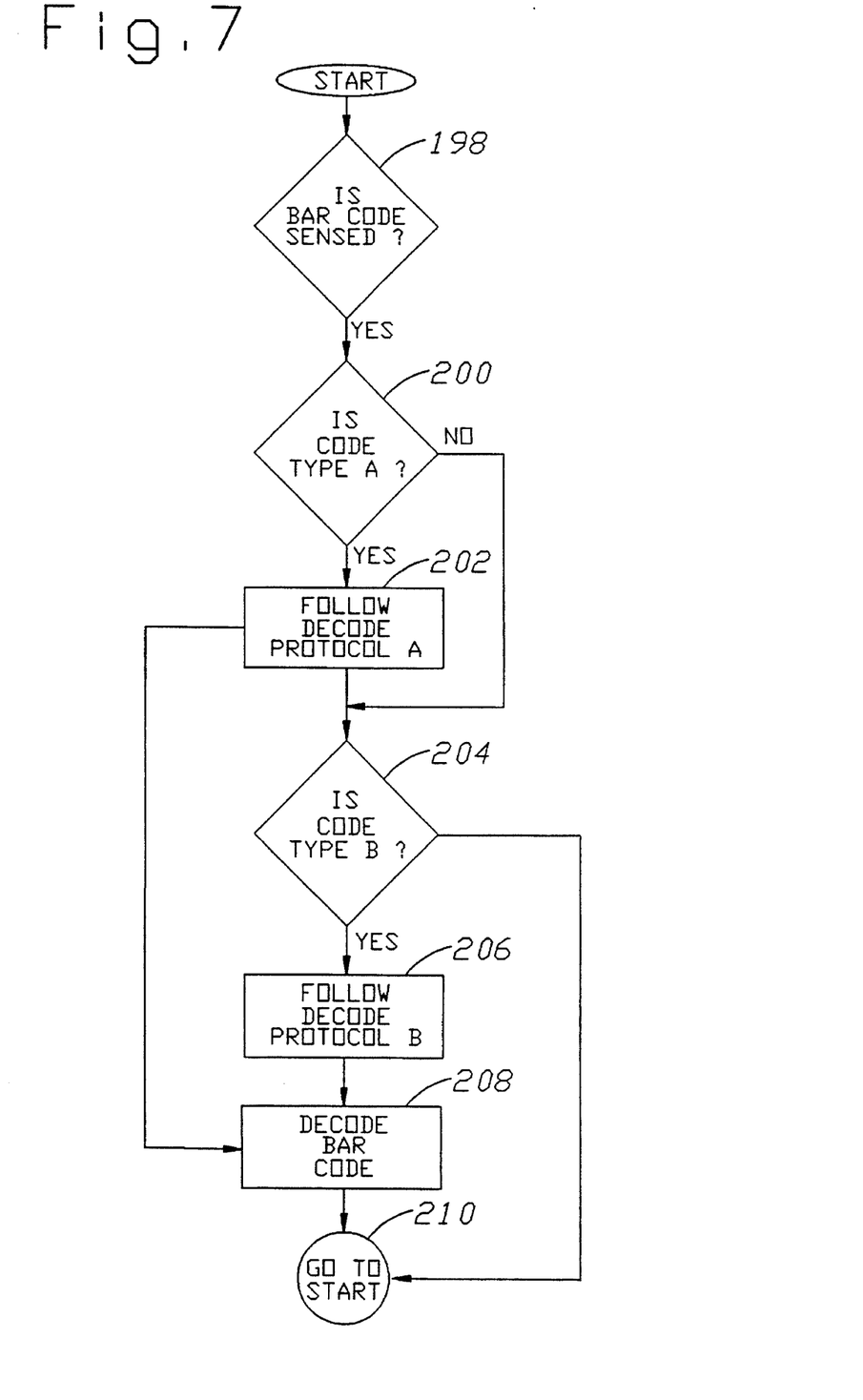
FIG. 7 is a flow chart for the preferred method of reading different bar codes.

The carrier account information which is unique to each carrier 26 is also preferably printed in a machine readable format such as a standard bar code 27. In keeping with one of the aspects of the invention, multiple types of bar codes are decodable by bar code reader 38 for enhanced versatility, as shown in FIG. 7. After the indicated carrier account data has been printed on a carrier 26, such as shown in FIGS. 3A and 3B, the printed carrier is passed via a path 50, to a form bar code reader 38 which photoelectronically senses the bar code associated with the printed account carrier information from each carrier 26. Obtaining one aspect of the carrier form bar code reader 38 preferably decodes the following bar codes: interleaved two of five code, interleaved three of nine code, Codabar UPC-A&E code, EAN-8 code and EAN-13 code. Code determination and decoding are performed in accordance with the algorithm shown in FIG. 7 and described below. The preferred apparatus for sensing and decoding is shown and described in the aforementioned U.S. patent application Ser. No. 08/036,159 of Hill et al. entitled "Card Package Production System With Burster and Carrier Verification Apparatus" filed Mar. 24, 1993, contemporaneously herewith. The read carrier information is passed via a suitable two way communication path 52 to the microprocessor 12 which compares it to the stored carrier information sent to the forms printer 48 via a communication path 54 to determine if there is a match. If the carrier account information read from the carrier 26 is the same as the carrier data obtained from the form data memory 44, then there will be a match and the correct printing of the carrier 26 is verified. In that event, and if there is a match with card information on a card 30 presented for attachment to the carrier 26, the printed forms continue through the form burster 36, the forms feeder-card inserter 24, the form folder 86, the form rotation block 88 to a card package outlet 55 to a form transporter 92 to move it to the envelope stuffer 34, then to the inserter 24 where they are mated with one or more verified and matching cards.

If, on the other hand, the carrier account information read from a carrier 26 does not match the carrier information stored in the carrier form data memory 44, then achieving another objective of the invention, the carrier advantageously is sent to a carrier form rejection area 90 to prevent the incorrect form from being stuffed into an envelope. The carrier 26 passes through the form burster 24 to the forms feeder-card inserter, or inserter, 24, while the card inserter is inhibited from mounting a card. The mismatched or incorrect carrier passes through the inserter 24 without receiving a card. It then passes through the form folder 86 and at the form reject rotation unit 88 it is pushed along path 87 to the form reject location 90. While other bar code readers could be utilized, preferably the form bar code reader 38 is preferably made by Opto Technology as part number QTR while preferably the decoding is performed by a forty pin IC made by Hewlett Packard under part number HBCR-1800. Reference should be made to U.S. patent application Ser. No. 08/036,439 of Kassabian et al. entitled "Card Package Production System With Modular Carrier Folding Apparatus for Multiple Forms" filed Mar. 24, 1993, contemporaneously herewith, for further information relating to the preferred form of the apparatus for rejecting the incorrect carriers.

While the carrier forms 26 pass through the forms printer 48 and to the inserter 24, the cards 30 make a similar journey from a stack of cards 30 through a blank cards feeder 58, a card graphics module 62, a card embosser/encoder/infill unit 20, an on line jitter tester 82, an embossed card mag stripe reader 57, an embossed card transporter, a card mag stripe reader 64, an embossed character reader 70 and a labeler to the card inserter 24.

The blank cards feeder 58 passes blank cards one at a time to a card graphics module 62 which inputs graphic lettering and designs selectively in color on the blank card surface. The card embosser 20 is preferably of the general type shown in U.S. Pat. No. 4,969,760 issued Nov. 13, 1990 to LaManna et al., or the like. The selected card graphics and card printing information is stored in a card graphics and card printing data section of the program memory 42 and relates to information that applies to all cards or a batch of cards and is not unique to each card, as distinguished from the card account data.

The card embosser 20 embosses the card account embossed information into each card in accordance with continued inputs sent via a communication path 68 which are determined by the microprocessor 12 from the card account embossed data section of the card data memory 40. The embossed card 30 is then sent to the card magnetic stripe encoder of the embosser/encoder unit 20 which encodes the magnetic stripe 35, FIG. 2, on the card 30 with magnetic stripe card information received on the communication path 68 from the microprocessor 12 which, in turn, it obtains from a magnetic stripe card encoding data section of the card data memory 40.

An embossed card magnetic stripe reader 57 reads and decodes information encoded on the magnetic stripe 35, FIG. 2, of the card 30 and compares it with the card account embossed information sent from the card data memory and read by the embossed character reader 70, FIG. 4. In addition, the read encoded information is compared to the encoded account information stored in card data memory 40 used to encode the card. If the encoded information on the magnetic stripe 35, FIG. 3, does not match stored card account information, does not match the embossed information read from the card or the embossed information read from the card does not match the stored embossed account data, then the embossed and encoded card 30 is sent to an embosser card reject area 69. Since the card is incorrectly encoded, it is advantageously prevented from being inserted into a carrier form 26 and stuffed into an envelope to achieve one aspect of the objective of the invention. If the card is correctly encoded, based on the reading by the embosser card M/S reader, the embossed and encoded cards 30 are then moved via the embossed/encoded card transporter 66 to the card magnetic stripe, or M/S reader 64, and the card embossed character reader 70 which respectively receives what is read by each via paths 72 and 74 and makes comparison to account data stored in the card data memory for each and also compares what is read by each to each other. The embossed character reader 70 is preferably of the type shown in U.S. Pat. No. B1 4,194,685 of Hill et al. entitled "Verifying Insertion System Apparatus and Method of Operation" issued Mar. 25, 1980, reissue certificate issued Feb. 19, 1985.

While other devices could be used successfully, preferably the embossed character reader 70 is made by Dynetics Engineering Corporation and is shown in U.S. Pat. No. 4,215,813, while the magnetic stripe reader 64 is preferably made by Brush Industries under part number 901-5290.

Coupled with the 486 DX computer 12 is a manually operated card jitter tester and analyzer 80 quality check tool built by Q-Card Corp. of Owings Mills, Md. A card is manually run through the jitter tester 80 and the computer 12 analyzes the encoding at seventy-five bits per inch of the card for track one and two hundred ten bits per inch for tracks two and three. The card jitter tester and analyzer 80 graphically displays a JT1A report on the display screen 16, FIG. 1, or on a print out indicating if the tested card has been properly encoded. Alternatively, an on line jitter tester 82 is placed for receipt of cards exiting the card embosser/encoder 20. Prior to carrying the embossed and encoded cards 30 to the card labeler 60 by the transporter 66, the on line card jitter tester and analyzer 82 reads the cards to verify proper encoding. Preferably, the jitter tester and analyzer 80 is like one made by Q-Card Company of Owing Mills, Md. and the on line jitter tester 82 is the same as jitter tester 80 but with a computer interface and automatic card transporter provided.

The microprocessor 12 compares each reading of the embossed information on the card 30 by the photoptical embossed character reader 70 and the magnetic stripe reader 64 to the account data information stored in the appropriate section of the data memory 40 and to each other. Advantageously, the information decoded from the magnetic stripe 35, FIG. 2, of the card 30 by the magnetic stripe reader 64 is compared with the embossed card character information read by the embossed character reader 70 to determine if there is a match. If there is a match of information, the card 30 is internally verified to be correct, and is passed to the inserter 24. If the coded information from the magnetic stripe reader 64 does not match the embossed character information on the card read by the embossed character reader 70 do not match each other, then the microprocessor 12 identifies the card as being incorrectly embossed or encoded and the card is rejected before insertion into a carrier.

After checking the embossed cards 30 for correctness and automatically rejecting the identified incorrect cards, the card transporter 66, under the control of the microprocessor 12, enables the card labeler 60 to label only those. The card labeler 60 automatically applies removable informational labels, such as stick-on card activation labels 21, FIGS. 3A and 3B, to only the correct cards 30. The computer 12 through means of card labeler 60 or, alternatively, the card labeler itself, accumulates information concerning the total number of informational labels applied to the cards 30 and the total number of correct cards. The passing of the correct cards 30 to the labeler is selectively performed either manually or automatically in a single card production apparatus 10, while the labeling is produced only automatically and only on verified correct cards. In this way, correct cards with labels are readily distinguished from rejected cards without labels.

The inserter 24, under control of reports from the microprocessor 12 via a communication path 76 causes the internally verified card 30 to be mounted to a matching carrier 26. Advantageously, the microprocessor via communication path 52 compares the coded carrier information read from the form bar code reader 38 with the coded card information read from the magnetic stripe reader 64 and the embossed information read by the embossed character reader 70 to determine if there is a match and thereby eliminates the need for synchronization between card and carrier production to achieve a match without verification. Advantageously, the card inserter 24 rejects the cards 30 which do not match the carrier information decoded from the carrier 26 before insertion into a carrier. The nonmatching cards are sent to an inserter card reject area 81 and the empty carrier 26 is separately sent to a carrier form reject area 90. Cards 30 having information which does not match the carrier information or the stored account information are prevented from being inserted into the corresponding carrier at the card inserter 24. The embossed cards 30 which have card information that do match the decoded carrier information are mounted to the matching carrier 26 at the card inserter 24.

One or more cards 30 are selectively insertable into a single matching carrier form 26. The automatic card mounting apparatus or card inserter 24 is located at an insertion station at which cards 30 are mounted to carrier forms 26 including those shown in FIGS. 3A and 3B. The embossed card package production system 10 routes cards 30 to a plurality of different carrier mailing forms 26. Referring to FIGS. 3A and 3B two types of carrier forms 26A and 26B employed in the system 10, FIG. 1, are shown holding embossed cards 30. The first type of form 26A, FIG. 3A, is flexible planar body 93 having a pair of spaced parallel ear shaped slots, or corner pockets, 28 for receipt of the sides 31 of a card 30 and one of either the top or the bottom of the card. The form 26A has a bottom flap, or lip, 33 for receipt of the other of the top or bottom or the card 30. The corner pockets 28 and the lip 33 are cut from the flexible planar body 93. The card 30 is held between the pockets 28 and the lip 33 at a location spaced from the periphery of the body 93. The corner pockets 28 hold the card 30 against movement in three of four possible rectilinear directions. The lip 33 engages with an edge of the card 30 and is intermediate to the corners of the card to hold the card 30 against movement in the fourth possible rectilinear direction.

A second type of carrier form 26B seen in FIG. 3B has a flexible planar body 93 with a pair of parallel spaced side slot sections 29 and a fold 89 to hold the card 30 within the side slots. The mailing form 26B has a pair of rectilinear slots 39 cut in the body 93 to form a pair of opposed corner pockets for receipt of opposed corners 41 of the card 30. The rectilinear slots 39 have a pair of parallel spaced slot sections 29 and a cross slot section 43 transversely extending between the pair of parallel spaced slot sections 29. In the form of FIG. 3A, the corner pockets open away from the leading end section and the address and toward the bar code field 27 while in the carrier of FIG. 3B, the address is located on the lagging end section while the pockets face toward the bar coding and away from the leading edge. Reference should be made to U.S. patent application Ser. No. 08/036,436 of Hill et al. entitled "Card Carrier Forms For Automated Embossed Card Package Production System" filed Mar. 24, 1993, contemporaneously herewith, for further details about each of these different types of carriers.

In the system 10 a card feeder or transporter 66 feeds cards 30 to the insertion station at which a card inserter 24 is located. The card inserter module 24 includes a forms feeder adapted to feed the different types of mailing carrier forms 26A and 26B from the fan of folded carriers to an insertion station. A first type of card insertion apparatus 24 is releasably mounted at the insertion station to insert cards 30 into one type of form carrier 26A. The card inserter 24 automatically mounts embossed cards 30 to the first type of carrier forms 26A. To insert cards 30 into a different or second type of carrier 26B in the ECPAP system 10, the first type of inserter is removed from the insertion station and mounted in its place is a second type of card insertion apparatus for inserting cards into the second type of carrier form 26B. The embossed cards 30 are automatically mounted to the second type of carrier mailing form 26B by using the second type of insertion apparatus. The preferred form of the different insertion apparatus for the different carrier forms are shown in U.S. patent application Ser. No. 08/036,664 of Hill et al. entitled "Embossed Card Package Production System With Modular Inserters For Multiple Forms and Card Verification Apparatus" filed Mar. 24, 1993, contemporaneously herewith.

After all the cards 30 have been attached to a matching carrier form 26, the inserter 24 passes the filled carrier form via path 84 to a form folder 86. The form folder 86 folds the loaded carrier 26 along two perforation lines 89, FIG. 3, to divide the carrier into three equal areas. As with the inserters, two different types of folders are alternatively employed for folding different types of carriers. The folded carrier forms 26 are rotated by an arm at a form rotation station 88 for insertion into mailing envelopes. Before being rotated, the form of FIG. 3A is flipped over after folding while the form of FIG. 3B does not and therefore different folders are used when there are different carrier forms. Empty carrier forms 26 which do not match with a corresponding card or are otherwise improperly prepared are sent via a transportation path 87 to a form reject area 90 to avoid placement into mailing envelopes. The preferred embodiment of the form folder 86, form rotation unit 88, form reject unit 90 and form transporter to envelope stuffer 92 are shown in U.S. patent application Ser. No. 08/036,439 of Kassabian et al. entitled "Card Package Production System With Modular Carrier Folding Apparatus For Multiple Forms" filed Mar. 24, 1993, contemporaneously herewith, and reference should be made thereto for details of how the different carriers of FIGS. 3A and 3B are folded different to point them both to the envelope stuffer in the correct orientation.

Folded carriers 26 with correctly matched embossed cards 30 are carried along a form transporter 92 to the envelope stuffer 34. The envelope stuffer 18 preferably used is a Pitney Bowes Spectrum Model F400. The envelope stuffer 34 places the filled and folded carrier form 26 into a window envelope from a supply of window envelopes. The stuffed envelopes are then sealed and passed to a postage metering machine (not shown) which applies correct postage to the envelope. The postage metering machine used is preferably one made by Pitney Bowes such as Paragon Mail Processor Model Nos. USS4–USS9, Eagle Model E660 or E670, or a Model 5300 or 5636.

Figure 5A:
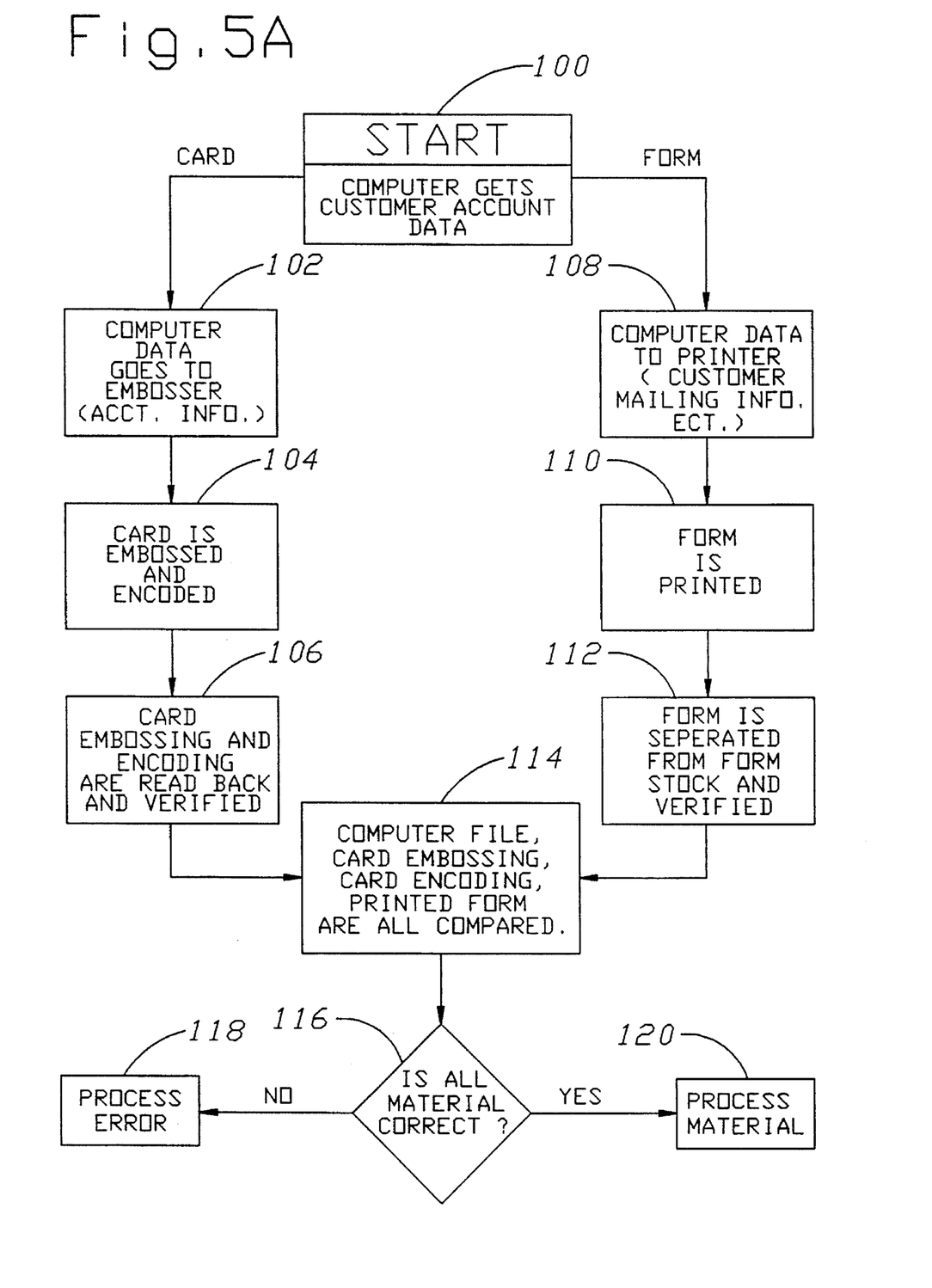
FIGS. 5A, 5B and 5C form a composite flow chart of the preferred computer operating program stored in the program memory of the card package production system of FIG. 4 and which is Appendix A of Ser. No. 08/019,865.

Referring now to FIG. 5A, the computer 12 retrieves customer account information in step 100 including the name of the customer, the account number, the date of issuance, the date of expiration as well as other information. In step 102 the account information is transferred to the embosser while in step 108 the form printer receives the customer mailing information. In step 104 the blank card is embossed and the magnetic stripe encoded with the account information while in step 110 the form is printed with the customer mailing information.

In step 106 the card is read back and verified with the computer file while in step 112 the form is separated from the stock and read at the bursting station. In step 114 the computer file, the embossed card information read from the card, the encoded information read from the card, and the printed information read from the carrier form are all compared together to determine if there is a match. In step 116 a determination is made as to whether all the information is correct.

Figure 5B:
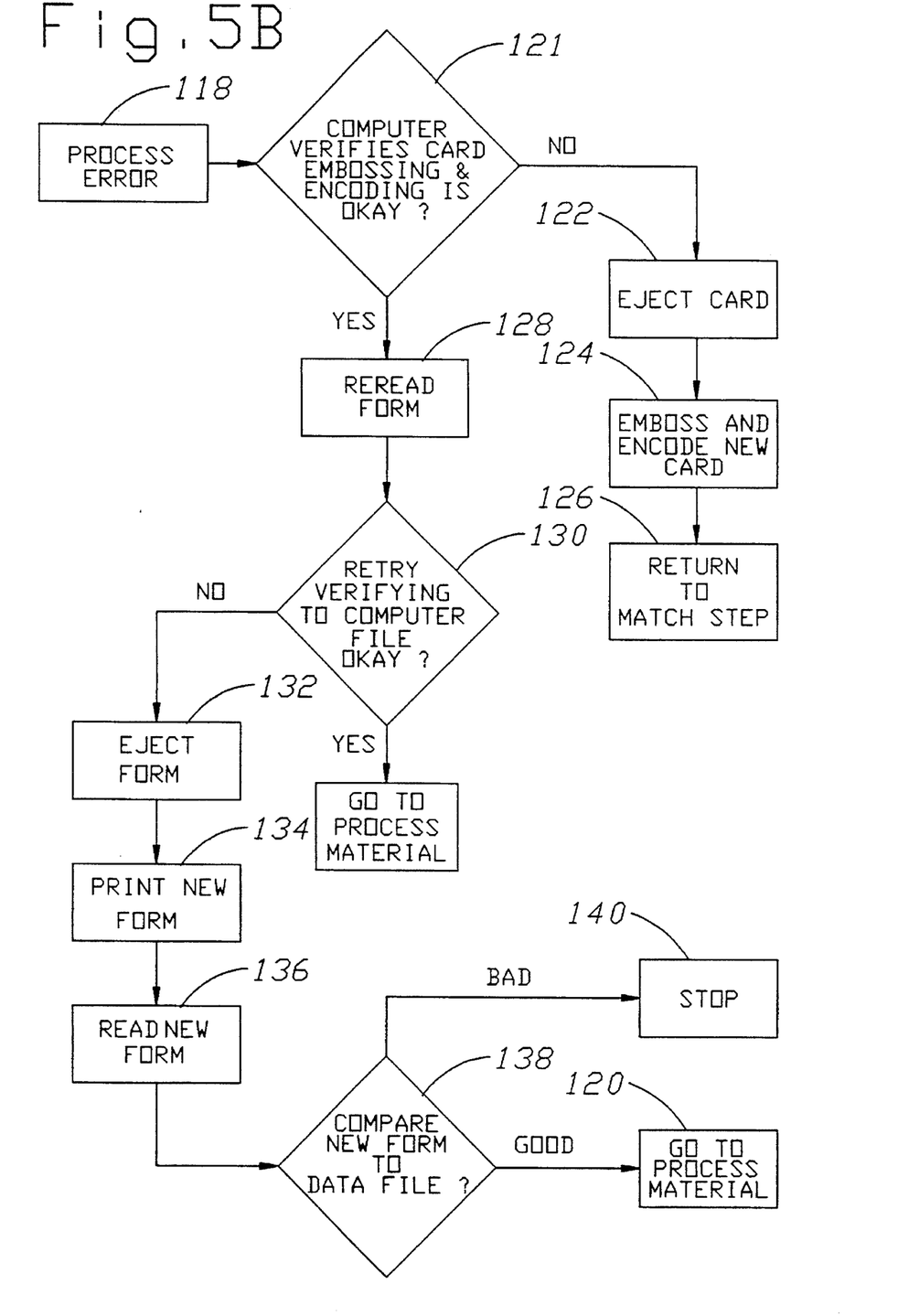

Referring now also to FIG. 5B, if all the information is not correct, the error is processed in step 118. In step 120 the counter verifies if the embossing and encoding are correct. If an error is detected, in step 122 the counter will cause rejection of the card and will then in step 124 cause a new card to be embossed and encoded. In step 126, after the new card is prepared, the counter returns to step 114 to compare the new card to determine if the new card has been properly prepared.

If in step 121 the card is verified to be prepared correctly, in step 128 the form will reread and in step 130 a comparison will be made to verify if the form and computer file match. If the form matches the file, the form and card are then processed in step 120 detailed in FIG. 5C.

If the form is correct, the form is ejected in step 132, a new form is printed in step 134, and the new form is read in step 136. In step 138 the new form is compared to the data file. If the file matches the form, a decision is made to process the card and form. If a discrepancy still occurs, the microprocessor based computer will stop the operation in step 140 and operator intervention is required.

Figure 5C:
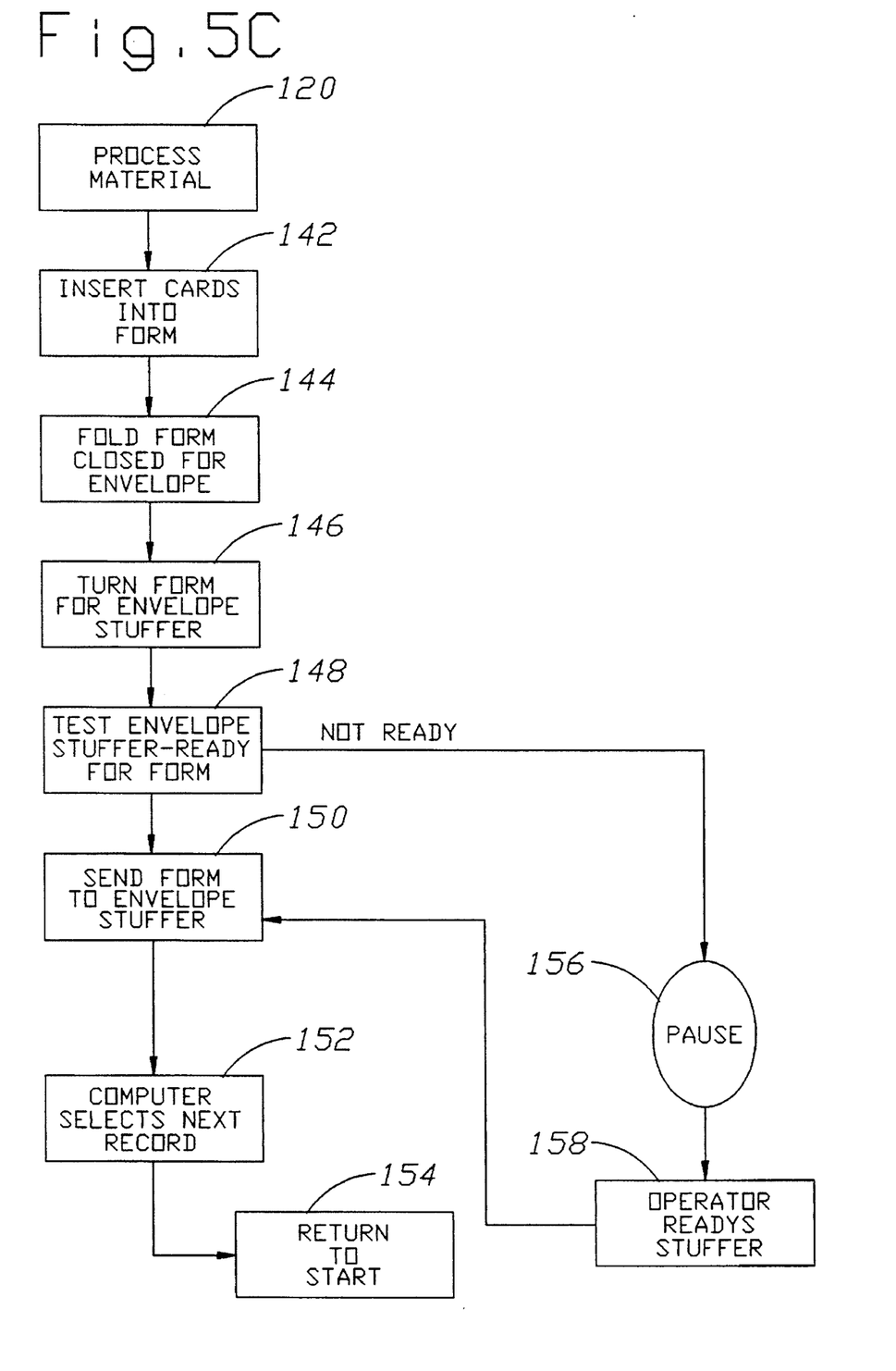

Referring now to FIG. 5C, if the embossed encoded card, the printed carrier form and the information in the computer file match and a decision has been made to process in step 120, in step 142 the computer 12 causes the cards to be inserted into the carrier form and then in step 144 fold the carrier forms are folded closed for insertion into envelopes. The forms are then turned ninety degrees in step 146 so that the forms are in proper alignment for insertion into an envelope by an envelope stuffer.

In step 148 the computer 12 checks if the envelope stuffer is ready for receipt of a form. If not ready, the computer 12 pauses in step 156 to allow the operator readies the stuffer in step 158. After it is determined in step 148 that the envelope stuffer is ready, the stuffed carrier forms are sent to the envelope stuffer in step 150.

The microprocessor based computer 12 selects the next customer account record in step 152 and returns to the start process 100, FIG. 5A, in step 154.

Figure 6A:
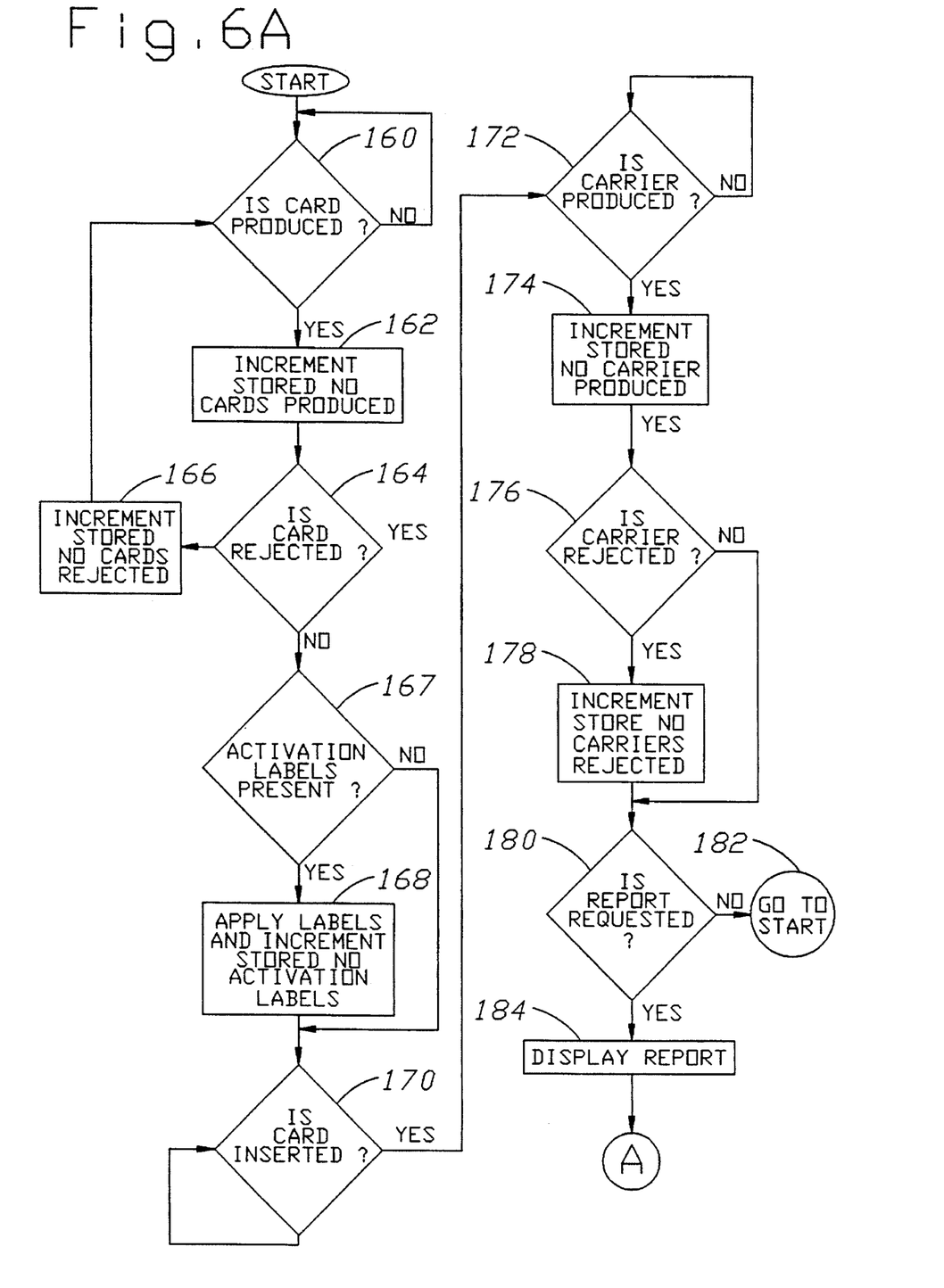
FIGS. 6A and 6B are flow charts of the preferred record keeping system of cards, carriers and labels.
Figure 6B:
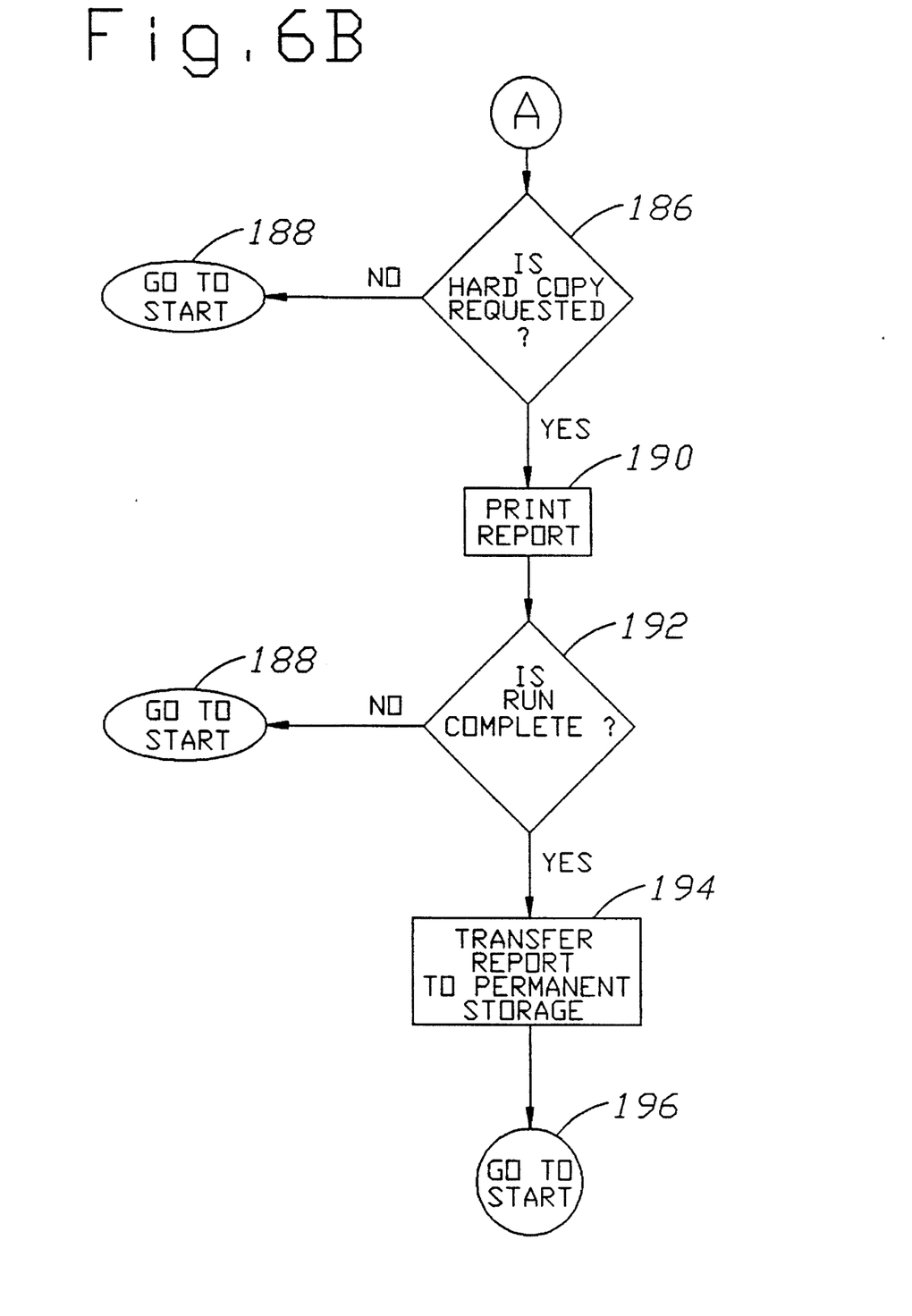

Referring to FIGS. 6A and 6B, also preferably performed in the embossed card pack production apparatus 10 is a method of processing credit card packages, each having at least one card with card information mounted to a mailing form with carrier information corresponding to the card information of the mounted card having the steps of: (1) rejecting cards which have incorrect card information, (2) rejecting carriers which have incorrect carrier information printed thereon, (3) accumulating card package production information including the number of cards rejected and the number of carriers rejected and (4) printing the card production package.

Still referring to FIG. 6A in which the microprocessor based computer 12 accounts for the number of customer accounts processed and rejected. In step 160 the computer 12 checks if a card is embossed and encoded, while in step 162 the number of cards produced is counted. In step 162 a determination is made whether the card has been rejected by the computer 12, while in step 166 the number of cards rejected is recorded. If the card is not rejected, in step 166 the computer checks if the activation labels are present and the labeler is ready. If the activation labels are present in step 168, labels are applied and the number of activation labels applied is stored. After labels are applied, if any, in step 170 it is determined whether the card (or cards) have been inserted into the carrier forms.

In step 172 the computer 12 checks if a carrier has been produced, while in step 174 the total number of carriers produced. In step 176 a determination is made whether a carrier has been rejected. If a carrier is rejected, in step 178 the counter adds another count to the total number of carriers rejected. If the carrier is not rejected, or the rejected carrier is accounted for in step 180, request for a report of current activity is mounted in step 180. If a report is not requested, in step 182 the program is returned to the start sequence. If a report is requested, the computer 12, in step 184, displays the report on the monitor 16.

Referring to FIG. 6B, the computer 12, in step 186, asks if a hard copy is requested. If no hard copy is requested, in step 182 the program returns to the start sequence. If a hard copy is requested, the computer 12 controls the carrier printer 48 to print the report in the very type and kind of carrier to which the report relates in step 184 and then requests in step 186 if the run is complete. If the run is not complete, in step 182 the program is returned to the start sequence. If the run is complete, the computer, in step 188, transfers the report to permanent storage, and returns the program to the start sequence in step 182.

Referring to FIG. 7, preferably the method of mounting cards 30 to carrier mailing forms 26 in the embossed card pack production system 10 includes the steps of: (1) reading card information from each of the cards, (2) sensing a code printed on a carrier, (3) automatically determining which of a plurality of different possible types of codes on the carriers is the code sensed from each carrier, (4) decoding from each carrier the code in accordance with the type of code determined for each carrier to obtain carrier information, (5) comparing the card information from each card with the obtained carrier information to determine if there is a match, (6) rejecting cards which do not match the carrier information decoded from the carrier, (7) mounting cards to carriers which have carrier information decoded from the plurality of codes that matches the card information of the cards.

Still referring to FIG. 7, the objective of the invention is obtained in part by employing a sensor and decoder which is capable of automatically sensing and decoding a plurality of different types of bar codes. The bar code reader 38 located at the form burster 36 reads the printed bar code checking, in step 198, if a bar code is sensed. If a bar code is detected, the computer 12 will check if the bar code is type A code in step 194. If the new code is type A, the computer in step 196 follows decode protocol A. If the new code is not type A, the computer 12 checks if the bar code is type B in step 198. If the bar code is not type B, the computer returns to stop in step 204. If the new code is type B, the computer 12 in step 206 follows decode protocol B. When the type of bar code has been determined, the computer 12 decodes the bar code in step 208 according to the appropriate protocol and then returns the program to the start sequence.

While a detailed description of the preferred embodiment of the invention has been given, it should be appreciated that many variations can be made thereto without departing from the scope of the invention as set forth in the appended claims.

We claim:

1. In a method of producing an embossed card package with verified embossed cards including the steps of prestoring embossed card information apart from a card to be used to emboss cards and accessing the prestored embossed card information to emboss the card with the prestored embossed card information, the improvement comprising the step of:

reading from the cards the embossed information on the cards with an embossed character reader;

comparing the embossed information read from the cards with the prestored embossed information for the card to determine if there is a mismatch; and automatically identifying as incorrect each card for which it is determined during the step of comparing that there is a mismatch.

2. The method of claim 1 including the step of mounting the embossed card to a card carrying mailing form unless the embossed card is identified as incorrect.

3. The method of claim 1 including the step of automatically rejecting cards identified as incorrect to prevent mounting of incorrect embossed cards to a carrier form.

4. The method of claim 1 including the steps of moving cards identified as incorrect in one direction to a rejected card location to prevent insertion of incorrect cards into carriers, and moving other cards not identified as incorrect in another direction different from said one direction to an inserter station for mounting to a carrier.

5. The method of claim 1 including the steps of accumulating totals of at least one of cards identified as incorrect and rejected, and cards not rejected, and printing the accumulated totals.

6. The method of claim 5 in which said step of printing includes the step of mounting the nonrejected cards to one of a plurality of types of carrier forms for each accumulated total and automatically printing the total on the very type of carrier form to which the nonrejected carriers are mounted.

7. The method of claim 5 including the steps of printing carrier information from carrier information stored with the prestored embossed card information on carrier forms with a carrier printer, and printing the accumulated total with the carrier printer.

8. The method of claim 1 including the steps of reading embossed card identifying information encoded on a magnetic stripe on the card, comparing the encoded identifying information read from the magnetic stripe to the embossed information to determine if there is a mismatch, automatically identifying as incorrect each card for which it is determined there is a mismatch.

9. The method of claim 8 including the step of comparing the encoded data with the prestored embossed card information for each card to determine if there is a mismatch, and identifying each card as incorrect for which there is a mismatch.

10. The method of claim 1 including producing a correct card to replace card identified as incorrect, holding a carrier in a position for mounting of the correct card thereto while the correct card is embossed in response to the identification of the other card as being incorrect.

11. A method of automatically producing verified embossed card packages, comprising the steps of:

preparing cards with machine readable indicia;

automatically applying labels with information relating to card activation to the cards at a location spaced from the machine readable indicia;

mounting the cards with applied labels to matching carriers with information that matches the machine readable indicia; and mailing the matching carrier with matched mounted cards with applied labels to a card user.

12. In a method of producing an embossed card package with a verified carrier including the steps of prestoring carrier information apart from a carrier to be used to print carriers and accessing the prestored carrier information to print the prestored carrier information on the carrier, the improvement comprising the steps of:

reading from each carrier information printed on the carrier;

comparing the carrier information read from said carrier with the prestored carrier information to determine if there is a mismatch; and automatically identifying each carrier as incorrect in response to the comparison of the read carrier information with the prestored carrier information determining there is a mismatch.

13. The method of claim 12 including the step of rejecting each carrier identified as incorrect to prevent mounting of a card to an incorrect carrier.

14. The method of claim 12 in which the step of reading includes determining a format type of the carrier information to be read, and decoding the read carrier information according to the format type determined.

15. The method of claim 12 including the steps of printing a new carrier to replace a carrier determined to be incorrect, and replacing the incorrect carrier with the new carrier.

16. The method of claim 15 including the steps of holding a card for a carrier identified as incorrect until a correct replacement carrier is printed, and mounting the card to the new replacement carrier.

17. The method of claim 12 including the steps of comparing information read from a card with a information read from the carrier to determine if there is a mismatch, and preventing mounting of the card to the carrier in the event it is determined that there is a mismatch.

18. The method of claim 12 including accumulating the total of carriers identified as incorrect for the selected kind of carrier, and printing the total number of incorrect carriers of a given kind on a carrier of the same given kind on a printer used to print the address information on the carriers.

19. A method of automatically producing verified embossed card packages, comprising the steps of:

automatically embossing the cards with selected card information;

automatically checking cards for correctness;

automatically rejecting incorrect cards;

passing correct cards to a labeler; and automatically applying removable informational labels to the correct cards passed to the labeler.

20. The method of claim 19 including the step of accumulating information concerning the total number of informational labels applied to cards and the total number of correct cards.

21. The method of claim 20 including the steps of printing carrier information on different kinds of carrier forms to which the cards are mounted, and printing the total number of labels applied to the cards on one of the carriers to which the labelled cards are mounted.

22. The method of claim 19 in which said step of passing is performed automatically in a single card package production system.

23. The method of claim 19 in which said step of passing is performed manually.

24. A method of automatically producing verified embossed card packages with cards mounted to mailing forms, comprising the steps of:

obtaining card information for each of the cards;

sensing a code printed on the carrier;

automatically determining which of a plurality of different possible types of codes on the carriers is the code sensed from each carrier;

decoding from each carrier the code in accordance with the type of code determined for each carrier to obtain carrier information;

comparing the card information for each card with the obtained carrier information to determine if there is a match;

rejecting cards which do not match the carrier information decoded from the carrier; and mounting cards to carriers which have carrier information decoded from said plurality of codes that matches the card information for each of the cards to be mounted to the carrier.

25. The method of claim 24 in which said step of sensing is performed by photoptically sensing the code of each carrier.

26. The method of claim 24 in which said different types of codes printed on the carrier are different types of bar codes.

27. A method of producing verified credit card packages, each having at least one card with card information mounted to a mailing form with carrier information corresponding to the card information of the mounted card, comprising the steps of:

rejecting cards which have incorrect card information independently of rejection of carriers with incorrect carrier information;

rejecting carriers which have incorrect carrier information printed thereon independently of rejection of cards with incorrect card information; and accumulating card package production information including accumulating the number of cards rejected and accumulating the number of carriers rejected independently of the step of accumulating the number of cards rejected with incorrect card information.

28. The method of claim 27 including the steps of mounting cards which are not rejected to carriers which are not rejected, and accumulating at least one of the number of cards mounted to carriers and the number of carriers to which cards are mounted.

29. The method of claim 27 including the steps of printing carrier information on the carriers with a carrier printer, and printing the accumulated card package production information with the carrier printer.

30. The method of claim 29 in which the step of printing includes the step of printing the accumulated card package production information on a carrier.

31. The method of claim 30 in which the step of accumulating said card package production information is performed with respect to cards mounted to different kinds of carriers, and the step of printing includes the step of printing the accumulated information on the same kind of carrier with respect to which the information is accumulated.

32. The method of claim 27 in which the step of printing includes the step of printing the accumulated card package production information on a carrier.

33. The method of claim 27 in which the step of accumulating said production information is performed with respect to cards mounted to different kinds of carriers, and the step of printing includes the step of printing the accumulated information on the same kind of carrier with respect to which the information is accumulated.

* * * * *